United States Patent
Mizutani et al.

(10) Patent No.: US 7,111,974 B2
(45) Date of Patent: Sep. 26, 2006

(54) SPREAD ILLUMINATING APPARATUS ADAPTED TO ALLOW LIGHT TO EXIT OUT FROM BOTH SURFACES OF LIGHT CONDUCTIVE PLATE

(75) Inventors: Hitoshi Mizutani, Iwata-gun (JP); Motoji Egawa, Iwata-gun (JP)

(73) Assignee: Minebea Co., Ltd., Kitasaku-gun ( * ) Notice: Subject to any disclaimer, the term of this patent is extended or adjusted under 35 U.S.C. 154(b) by 190 days.

(21) Appl. No.: 10/777,165

(22) Filed: Feb. 13, 2004

(65) Prior Publication Data

US 2004/0165401 A1    Aug. 26, 2004

(30) Foreign Application Priority Data

Feb. 20, 2003    (JP) .............................. 2003-042577

(51) Int. Cl.
*F21V 7/04*    (2006.01)
(52) U.S. Cl. ............... 362/607; 362/558; 362/561; 349/65
(58) Field of Classification Search ............... 362/24, 362/26, 31, 330, 558, 561, 600–602, 606, 362/607–608, 609, 628, 611, 612, 617–620, 362/623–625, 550, 560; 349/64, 65, 67, 349/73, 96, 113, 143, 61
See application file for complete search history.

(56) References Cited

U.S. PATENT DOCUMENTS

| | | | |
|---|---|---|---|
| 5,134,549 A * | 7/1992 | Yokoyama | 362/623 |
| 5,521,797 A * | 5/1996 | Kashima et al. | 362/617 |
| 5,600,455 A * | 2/1997 | Ishikawa et al. | 349/57 |
| 5,764,315 A * | 6/1998 | Yokota et al. | 349/62 |
| 5,851,062 A * | 12/1998 | Shinohara et al. | 362/620 |
| 5,883,684 A * | 3/1999 | Millikan et al. | 349/65 |
| 5,944,405 A * | 8/1999 | Takeuchi et al. | 362/617 |
| 6,139,161 A * | 10/2000 | Honda et al. | 362/17 |
| 6,239,851 B1* | 5/2001 | Hatazawa et al. | 349/62 |
| 6,243,150 B1 | 6/2001 | Watanabe et al. | |
| 6,443,585 B1 | 9/2002 | Saccomanno | |
| 6,466,292 B1* | 10/2002 | Kim | 349/143 |
| 6,529,250 B1 | 3/2003 | Murakami et al. | |
| 6,679,613 B1 | 1/2004 | Mabuchi | |
| 6,853,418 B1* | 2/2005 | Suzuki et al. | 349/113 |
| 6,871,975 B1* | 3/2005 | Chuang | 362/27 |
| 6,897,914 B1* | 5/2005 | Yoshida | 349/65 |
| 2003/0063234 A1* | 4/2003 | Oda et al. | 349/65 |
| 2005/0073627 A1 | 4/2005 | Akiyama | |

* cited by examiner

*Primary Examiner*—Ali Alavi
(74) *Attorney, Agent, or Firm*—Oliff & Berridge, PLC

(57) ABSTRACT

A spread illuminating apparatus for illuminating two objects includes: at least one light source; a light conductive plate having the at least one light source at an end surface thereof and defining first and second major surfaces from which light emitted from the at least one light source and introduced in the light conductive plate exits out respectively toward two objects to be illuminated; an optical sheet unit consisting of a diffuser sheet and condenser sheets, and disposed on at least the second major surface so as to cover an entire area thereof; and a reflecting means having a smaller surface area than the second major surface, and disposed directly on top of the optical sheet unit.

9 Claims, 8 Drawing Sheets

Fig. 11
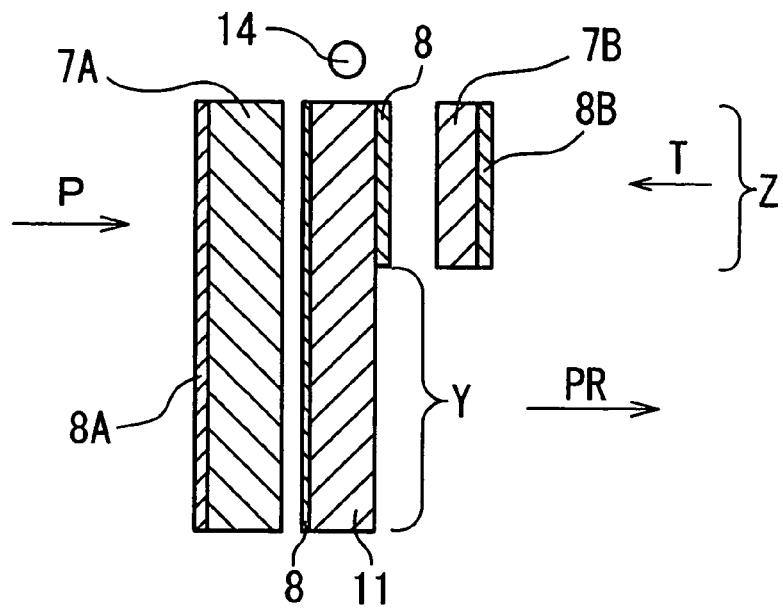
Fig. 12A
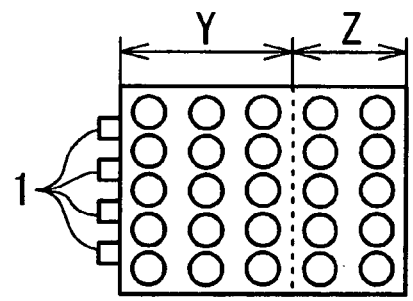
Fig. 12B
| Y | | | Z | |
|---|---|---|---|---|
| 19 | 21 | 22 | 24 | 27 |
| 22 | 22 | 23 | 24 | 27 |
| 22 | 22 | 23 | 24 | 26 |
| 22 | 22 | 22 | 24 | 26 |
| 19 | 20 | 21 | 23 | 26 |

SPREAD ILLUMINATING APPARATUS ADAPTED TO ALLOW LIGHT TO EXIT OUT FROM BOTH SURFACES OF LIGHT CONDUCTIVE PLATE

BACKGROUND OF THE INVENTION

1. Field of the Invention

The present invention relates to a spread illuminating apparatus, and more particularly to a spread illuminating apparatus in which light exits out from both major surfaces of a light conductive plate.

2. Description of the Related Art

There has been a demand for a display device which has two viewing screens disposed in parallel with each other so as to sandwich an illuminating apparatus, and which is convenient for a situation where an electronics device, such as a notebook personal computer, is operated by a teacher, an instructor or a sales person while pupils, students or customers view images displayed. FIG. 10 is a schematic cross sectional view of a conventional display device for a notebook personal computer, introduced to answer the aforementioned demand. Such a display device is disclosed in, for example, Japanese Patent Application Laid Open No. H10-90678.

Referring to FIG. 10, a display device is foldably attached to a notebook personal computer. The display device comprises: a backlight system which comprises a cold-cathode fluorescent lamp 14 as a light source, a light conductive plate 11, and a reflector sheet 6 surrounding the cold-cathode fluorescent lamp 14; and two liquid crystal display (LCD) panels which each comprise a liquid crystal element 7, two glass plates 5 sandwiching the liquid crystal element 7, and two polarizer sheets 8 placed respectively on the two glass plates 5, and which are bonded respectively to both major surfaces of the light conductive plate 1 of the backlight system. Light emitted from the cold-cathode fluorescent lamp 14 is introduced into the light conductive plate 11 directly and indirectly via the reflector sheet 6 disposed surrounding the cold-cathode fluorescent lamp 14, and exits out entirely from the light conductive plate 11 through the both major surfaces thereby enabling images to be viewed at the both sides of the display device.

Under the circumstances, in recent years, more and more portable telephones are coming out with a built-in camera, and a person to be photographed, as well as a person to photograph, may want to monitor an image to be photographed from a side opposite to a side of the person to photograph. To meet this request, a display device comprises two LCD panels provided respectively at both sides of the portable telephone. In such a case, the two LCD panels may be different in display screen size, which raises a problem with the display device described above with reference to FIG. 12. Referring to FIG. 11, a person to photograph views one LCD panel (liquid crystal element 7A) from a direction P and a person to be photographed views the other LCD panel (liquid crystal element 7B) from a direction T. Here, the one LCD panel 7A has a larger display screen size than the LCD panel 7B. FIG. 11 also shows a light conductive plate 11, well-known polarizer plates 8, 8A and 8B, and a cold-cathode fluorescent lamp 14. Since the LCD panel 7A is larger than the LCD panel 7B, the light conductive plate 11 defines, on a side toward the LCD panel 7B, an area Y (hereinafter referred to as non-display area) which is not covered by the LCD panel 7B, and an area Z (hereinafter referred to as display area) which is covered by the LCD panel 7B. As shown in FIG. 11, light PR exiting out from the light conductive plate 11 toward the person to be photographed is not utilized at the non-display area Y and gone uselessly, which means wasted electric power of the light source thus having a critical impact on an electronics device, such as a portable telephone, which strongly demands low power consumption.

While light exiting out from the light conductive plate 11 at the non-display area Y is gone uselessly, light exiting out at the display area Z is incident on the LCD panel 7B and partly reflected thereby to be brought back into the light conductive plate 11, and then introduced in the LCD panel 7A to illuminate the LCD panel 7A. As a result, the person to photograph notices difference in brightness over the LCD panel 7A such that an area corresponding to the display area Z is brighter than an area corresponding to the non-display area Y.

In a 1.8 inch LCD used in a typical portable telephone, which is structured as shown in FIG. 11, for example, four light emitting diodes (LEDs) are disposed as light sources 1 as shown in FIG. 12B which, together with FIG. 12A, explains spot-by-spot brightness over the LCD panel 7A, where brightness of the LCD panel 7A measured at each spot indicated in FIG. 12A is shown in FIG. 12B (figures are relative values of actual measurement). Here, it is to be noted that the LCD panel 7B with a smaller display screen size is disposed away from the light sources 1 unlike shown in FIG. 11. FIG. 12B indicates that brightness is higher at spots located corresponding to the display area Z than at spots located corresponding to the non-display area Y, rendering a maximum difference of 1.4 times. That is, light emitted from the light sources 1 is wasted at the non-display area Y thereby causing uneven brightness over the LCD panel 7A.

SUMMARY OF THE INVENTION

The present invention has been made in light of the problem described above, and it is an object of the present invention to provide a spread illuminating apparatus, which illuminates two objects, such as LCD elements, provided respectively over both major surfaces of a light conductive plate and having respective display screen sizes different from each other, and in which light exiting out from the both major surfaces of a light conductive plate is effectively utilized thereby reducing unevenness in brightness incurred over one illuminated object of the two having a larger display screen size in order to realize an excellent visibility.

In order to achieve the object, according to one aspect of the present invention, a spread illuminating apparatus includes: at least one light source; a light conductive plate having the at least one light source at an end surface thereof and defining first and second major surfaces from which light emitted from the at least one light source and introduced in the light conductive plate exits out respectively toward two objects to be illuminated; an optical sheet unit consisting of a diffuser sheet and a condenser sheet, and disposed on at least the second major surface so as to entirely cover it; and a reflecting means having a smaller surface area than the second major surface, and disposed directly on top of the optical sheet unit.

In the aspect of the present invention, the reflecting means may be located so as to cover an area of the second major surface other than an area designated as a light exiting surface.

In the aspect of the present invention, the diffuser sheet may have a haze factor ranging from 85 to 95%.

In the aspect of the present invention, the condenser sheet may be composed of two optical films which each have a prism pattern with a serrated sectional configuration formed on a surface thereof opposite to a surface facing the light conductive plate, and which have their respective prism patterns oriented orthogonal to each other.

In the aspect of the present invention, each film of the condenser sheet may have a thickness ranging from 50 to 300 μm.

In the aspect of the present invention, the reflecting means may have its reflectance gradually varying at a given area close to the area designated as a light exiting surface.

In the aspect of the present invention, a deflecting means may be disposed directly on top of the optical sheet unit on the second major surface so as to cover at least an area which is not covered by the reflecting means.

Consequently, light exiting out from the both major surfaces of the light conductive plate can be effectively utilized, whereby increased brightness, reduced unevenness in brightness and improved visibility over the first major surface of the light conductive plate can be achieved.

BRIEF DESCRIPTION OF THE DRAWINGS

The above object and other advantages of the present invention will become more apparent by describing in detail the preferred embodiments of the present invention with reference to the attached drawings in which:

FIG. 11 is a schematic cross sectional view of another conventional spread illuminating apparatus which illuminates two LCD panels having respective display screen sizes different from each other, and explains a problem associated therewith; and FIGS. 12A and 12B are explanatory views of brightness over one major surface of a light conductive plate facing a larger LCD panel, in the conventional spread illuminating apparatus of FIG. 11.

DETAILED DESCRIPTION OF THE PREFERRED EMBODIMENTS

Figure 1A:
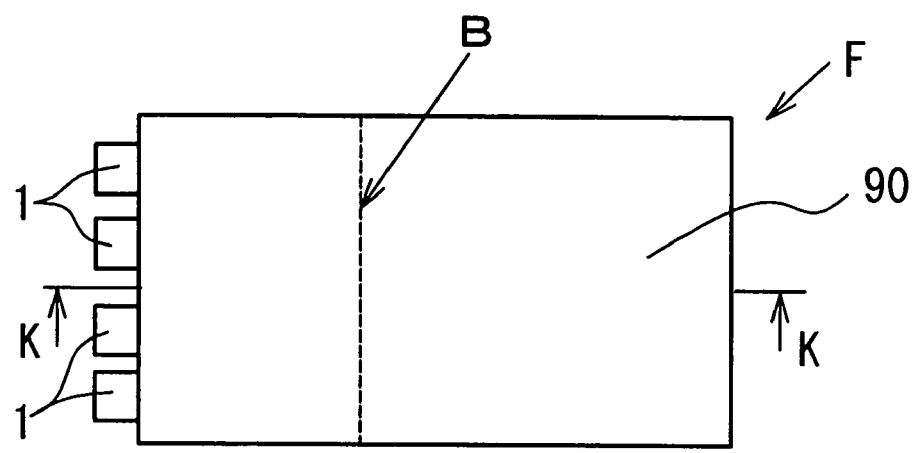
FIG. 1A is a top plan view of a spread illuminating apparatus according to a first embodiment of the present invention.

A first embodiment of the present invention will be described with reference to FIGS. 1A and 1B. A light conductive plate 11 has an end surface at which a plurality (four in the figure) of light sources 1, such as light emitting diodes (LEDs), are disposed, and through which light emitted from the light sources 1 is introduced, and has two major surfaces, specifically a first major surface 90 and a second major surface 91 through which the light introduced in the light conductive plate 11 exits out respectively toward two objects (not shown) to be illuminated. An optical sheet unit, which consists of a diffuser sheet 30, and condenser sheets 40, 41, is disposed on at least the second major surface 91 so as to cover the entire area thereof. A reflector plate 2, as a reflecting means, having a smaller area than the second major surface 91 is placed on top of the optical sheet unit. Thus, the optical sheet unit is to cover not only an area Z (hereinafter referred to as "display area") from which light exits out and to which one of the two objects to be illuminated is disposed, but also an area Y (hereinafter referred to as "non-display area") at which the reflector plate 2 is disposed so as to reflect light back toward the light conductive plate 11. The optical sheet unit fulfills its original and primary function if disposed to cover only the display area Z, but has an additional effect if disposed to cover also the non-display area Y.

As described later with reference to FIGS. 3A and 3B, the light conductive plate 11 may have a liquid crystal display (LCD) element as an illuminated object disposed on the first major surface 90, and another LCD element as an illuminated object disposed on the second major surface 91, wherein the LCD element disposed on the second major surface 91 has a smaller display size than the LCD element disposed on the first major surface 90. In this connection, the illuminated objects may be other elements than the LCD elements and may not be in contact with the light conductive plate 11. In other words, an illuminating apparatus of the present invention may be used to illuminate the surfaces of objects which do not include display elements and which are disposed apart from the light conductive plate 11. Further, a reflective polarizer having a surface area substantially equal to an area of the illuminated object may be disposed directly on the condenser sheet 41 whereby only linear polarized light can exit out toward the illuminated object. A reflective polarizer selectively transmits one of two linear polarized light rays perpendicular to each other and reflects the other light ray. "DBEF series" by Sumitomo Three M Co., Ltd. is a well-known reflective polarizer. The reflective polarizer may be substituted by an absorptive polarizer which is less expensive than the reflective polarizing means. However, the reflective polarizer is preferable for better utilization of light. It was found that whichever type of polarizer disposed directly on top of the condenser sheet 41 prevents effectively a viewer from noticing the illuminated object disposed toward the second major surface 91 when viewing from the first major surface 90.

The light conductive plate 11 is made of a highly transparent material, such as glass, polycarbonate, polyester, polymethylmethacrylate, and so forth, and has, on at least one of the both major surfaces 90, 91, a well-known dot pattern (not shown) which is formed with appropriate configuration and position, and which is adapted to scatter exiting light in order to achieve a substantially uniform emission everywhere from the major surface. The diffuser sheet 30 may be formed such that diffusing agent is included therein or that its surface is roughened, and diffuses light to thereby prevent a viewer from noticing the dot pattern formed on the light conductive plate 11. A diffuser sheet having a larger haze factor (=ratio of diffused transmittance to total transmittance) is more diffusive and better prevents the dot pattern configuration from being noticed by a viewer. When the diffuser sheet 30 is arranged in contact with the condenser sheet 40, the front brightness is increased if the haze factor of the diffuser sheet is set to be somewhat large, but if the haze factor is set to be too large its transmittance is lowered therefore causing the brightness to decrease. Thus, the haze factor of the diffuser sheet 30 is preferably set to range from 85 to 95%. The thickness of the diffuser sheet 30 is not specifically determined, but usually is 10 μm or more, and preferably 20 to 300 μm. The diffuser sheet 30 may be formed of any transparent resin material, such as polycarbonate, polyester, polymethylmethacrylate, and so forth.

Figure 2A:
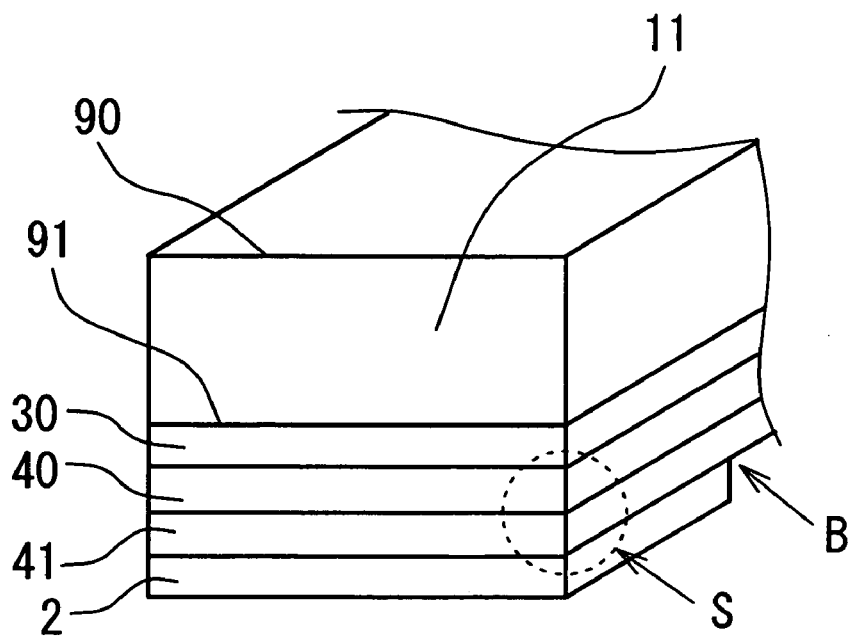
FIG. 2A is a perspective view of a part of FIG. 1A/1B seen from a direction F.
Figure 2B:
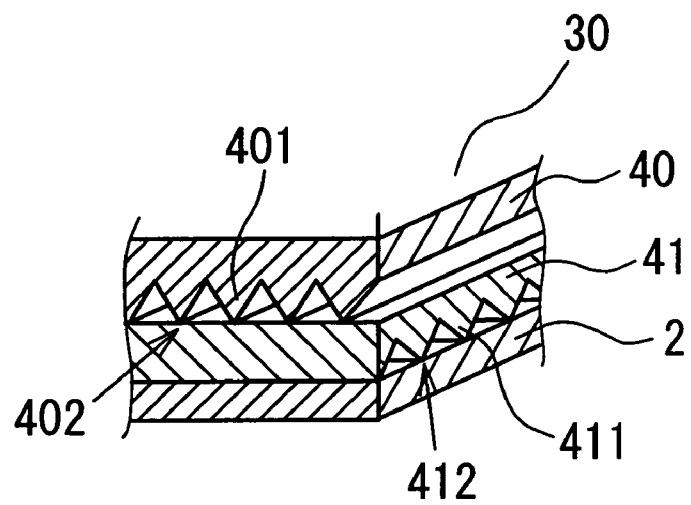
FIG. 2B is an enlarged schematic view of a portion S of FIG. 2A.

Referring to FIGS. 2A and 2B, the condenser sheet 40 is layered on top of the diffuser sheet 30, and then the condenser sheet 41 is layered on top of the condenser sheet 40. The condenser sheets 40, 41 are well-known BEF (Brightness Enhancement Film) which is an optical film formed such that a prism pattern comprising a plurality of minute prisms is high-precision formed on the surface of polyester or acrylic resin which is excellent in transmittance. When such an optical film with minute prisms arrayed is disposed, as a filter, between the light conductive plate 11 and the object to be illuminated, a higher front brightness is achieved with the same amount of backlight.

The condenser sheets 40, 41 are set in contact with each other such that their respective prism patterns 401, 411 face outward and are oriented orthogonal to each other, specifically respective ridgelines 402, 412 of the prism patterns 401, 411 are oriented orthogonal to each other. The structure of the respective prism patterns 401, 411 being oriented orthogonal to each other enhances performance, eliminates wetout (blurring of screen), and suppresses reflective moire (striped pattern formed by portions of light gleaming and portions of light diffused).

The orientation angle of the ridgeline 402 (or 412) with respect to a boundary (indicated by B in FIGS. 1A and 1B) defined between the reflector plate 2 and the display area Z is not specifically set. That is to say, the condenser sheets 40, 41 which are attached to each other with their prism patterns 401, 411 oriented orthogonal to each other are disposed such that the ridgeline 402 (or 412) is oriented at an angle optionally determined as appropriate with respect to the light conductive plate 11. The condenser sheets 40, 41 having a larger thickness provide a better visibility, but have a lower transmittance and also lead to a larger dimension of the entire apparatus. Accordingly, the thickness of each of the condenser sheets 40, 41 is preferably set to range from 50 to 300 μm.

Figure 1B:
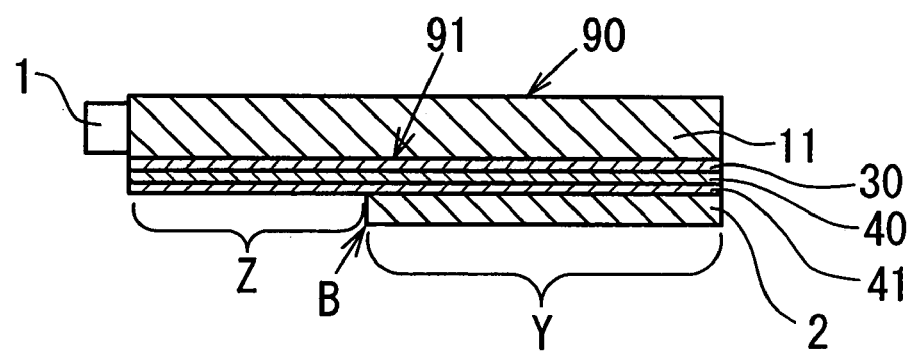
FIG. 1B is a schematic cross sectional view of FIG. 1A taken along a line K—K.

The reflector plate 2, which has a smaller surface area than the second major surface 91, is disposed on top of the optical sheet unit so as to cover the non-display area Y (refer to FIG. 1B). The second major surface 91 is zoned into the non-display area Y and the display area Z, and the reflector plate 2 is disposed at the non-display area Y while an illuminated object (not shown), such as an LCD element, is disposed corresponding to the display area Z. Thus, the reflector plate 2 is disposed on the second major surface 91 at an area other than the display area Z at which light exits out so as to illuminate the object.

With the reflector plate 2 arranged as described above, while light exits out at the display area Z, light is reflected by the reflector plate 2 at the non-display area Y, brought back into the light conductive plate 11 and exits out therefrom through the first major surface 90 thereby increasing the brightness over the first major surface 90. The reflector plate 2 is a plate which has its surface coated with a material having a high reflectance, such as silver, or may alternatively be a plate of metal or dielectric multi-layer film.

Operation of the first embodiment shown in FIGS. 1A and 1B win be discussed. Light emitted from the light sources 1 and introduced in the light conductive plate 11 is directed toward the first and second major surfaces 90, 91. Light directed toward the first major surface 90 exits out entirely therefrom. On the other hand, light directed toward the second major surface 91 exits out at the display area Z, and is reflected by the reflector plate 2 at the non-display area Y. The light reflected by the reflector plate 2 passes through the condenser sheets 41, 40, and the diffuser sheet 30, returns to the light conductive plate 11, and finally exits out from the first major surface 90 thus contributing to increasing the brightness of the first major surface 90. In this connection, the light reflected by the reflector plate 2 is scattered through refraction, reflection and diffusion by the condenser sheets 41, 40 and diffuser sheet 30, whereby difference in brightness generated across the boundary B or nonuniformity of reflected light resulting from flaws on the reflector plate 2 can be reduced. Thus, light exits out from the first major surface 90 in a uniform manner significantly improving the visibility for a viewer. Meanwhile, the light exiting out at the display area Z illuminates the object (not shown). This way, the light introduced in the light conductive plate 11 and directed toward both the first and second major surfaces 90, 91 is fully utilized, resulting in that the brightness of the first major surface 90 is increased thereby reducing unevenness in the brightness over the first major surface 90.

Figure 9A:
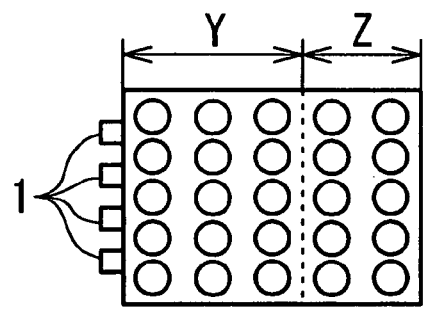
FIGS. 9A and 9B are explanatory views of brightness over one major surface of a light conductive plate not having a reflector plate thereon, in the spread illuminating apparatus of FIG. 1B.
Figure 9B:
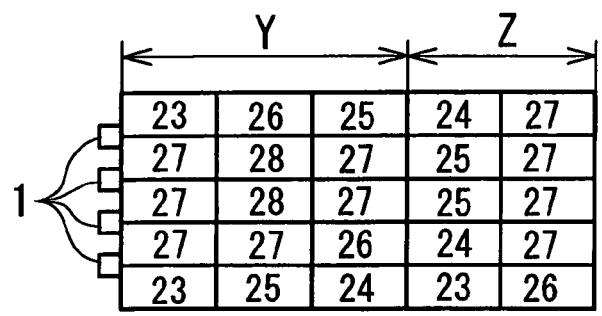
Figure 10:
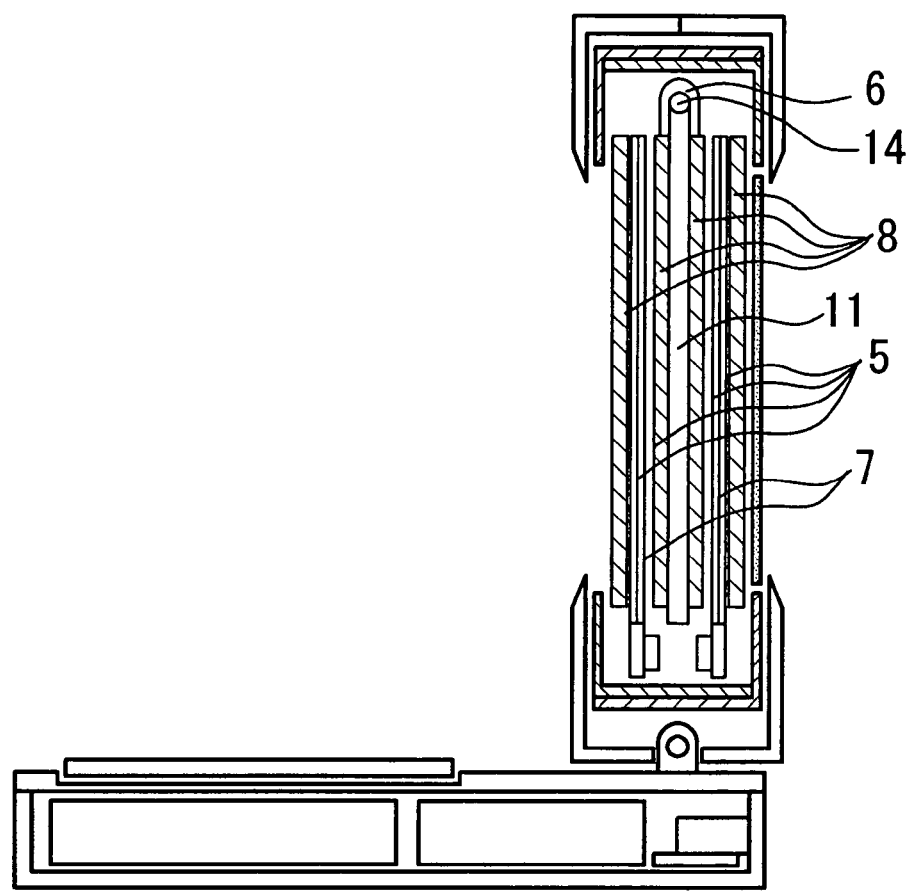
FIG. 10 is a schematic cross sectional view of a conventional spread illuminating apparatus which illuminates two LCD panels having a display screen sizes equal to each other.

Improvement in the brightness of the first major surface 90 of the light conductive plate 11 in the first embodiment will be discussed with reference to FIGS. 9A and 9B. Here, it is to be noted that the non-display area Y at which the reflector plate 2 is disposed is located close to the light sources 1 unlike shown in FIG. 1B. FIGS. 9A and 9B explain spot-by-spot brightness over the first major surface 90, wherein brightness measured at each spot indicated in FIG. 9A is shown in FIG. 9B (figures are relative values of actual measurement). As seen from FIG. 9B, the spots located corresponding to the non-display area Y have their brightness increased by about 20% compared with the measurement result shown in FIG. 11B, whereby the difference in brightness between the display area Z and the non-display area Y is reduced to 1.02 times, which proves that the reflector plate 2 is very effective in fully utilizing light thereby reducing the unevenness in the brightness over the first major surface 90.

A second embodiment of the present invention will now be described with reference to FIGS. 3A and 3B. In explaining the second embodiment, any component parts identical with or corresponding to those in the first embodiment are denoted by the same reference numerals, and a detailed description thereof will be omitted below. Referring to FIG. 3B, a spread illuminating apparatus according to the second embodiment includes: a light conductive plate 11 defining first and second major surfaces 90, 91; a plurality (four in the figure) of light sources 1, such as light emitting diodes (LEDs), disposed at an end surface of the light conductive plate 11: a first LCD element D1 as an object to be illuminated, which is disposed to entirely cover the first major surface 90 of the light conductive plate 11 such that an optical sheet unit consisting of a diffuser sheet 30 and condenser sheets 40, 41 is sandwiched therebetween in a contact manner; and a second LCD element D2 as an object to be illuminated, which has a smaller display area than the first LCD element D1 and is disposed to partly cover the second major surface 91 such that an optical sheet unit consisting of a diffuser sheet 30 and a condenser sheets 40, 41 is sandwiched therebetween in a contact manner. Here, an area of the second major surface 91 covered by the second LCD element D2 is referred to as a display area Z, and an area not covered thereby is referred to as a non-display area Y. A reflective or absorptive polarizer may be disposed on top of the optical sheet unit like the first embodiment.

The first LCD element D1 comprises a liquid crystal element 70, and two deflector plates 80 formed respectively on both surfaces of the liquid crystal element 70, and the second LCD element D2 comprises a liquid crystal element 71, and two deflector plates 81 formed respectively on both surfaces of the liquid crystal element 71. The first and second LCD elements D1 and D2 in the discussion to follow are, for example, TN (twisted nematic) type liquid crystal element which requires two polarizer sheets, but may alternatively be GH (guest host) type or ferroelectric type liquid crystal element which requires one polarizer sheet or does not require any. If a reflective or absorptive polarizer is employed as mentioned above, then one deflector sheet 81 of the second LCD element D2 facing the optical sheet unit may be omitted.

The non-display area Y, which is not covered by the second LCD element D2, has a reflector plate 2 disposed directly on the optical sheet unit. The reflector plate 2 reflects light toward the first LCD element D1. A boundary B is defined between the reflector plate 2 and the second LCD element D2. The reflector plate 2 is a plate which has its surface coated with a material having a high reflectance, such as silver, or may alternatively be a plate of metal or dielectric multi-layer film.

Operation of the second embodiment shown in FIGS. 3A and 3B will be discussed. Light emitted from the light sources 1 and introduced in the light conductive plate 11 is directed toward the first and second major surfaces 90, 91. Light directed toward the first major surface 90 exits out entirely therefrom. On the other hand, light directed toward the second major surface 91 exits out at the display area Z, and is reflected by the reflector plate 2 at the non-display area Y. The light reflected by the reflector plate 2 passes through the condenser sheets 41, 40, and the diffuser sheet 30, returns to the light conductive plate 11, and finally exits out from the first major surface 90 to be introduced into the first LCD element D1 thus contributing to increasing the brightness of the first LCD element D1. In this connection, as described above in explanation of the first embodiment, the light reflected by the reflector plate 2 is scattered through refraction, reflection and diffusion by the condenser sheets 41, 40 and diffuser sheet 30, whereby difference in brightness generated across the boundary B or nonuniformity of reflected light resulting from flaws on the reflector plate 2 can be reduced. Thus, the light exiting out from the first major surface 90 into the first LCD element D1 is uniformized thereby significantly improving the image quality on the first LCD element D1. Meanwhile, the light exiting out at the display area Z is introduced into the second LCD element D2 to increase the brightness of the second LCD element D2. This way, the light introduced in the light conductive plate 11 and directed toward both the first and second major surfaces 90, 91 is fully utilized, resulting in that the brightness of the first LCD element D1 is increased thereby reducing unevenness in the brightness over the first LCD element D1.

Further improvements achieved by modifying the reflector plate 2 will now be discussed with reference to FIGS. 4 to 8. The provision of the reflector plate 2 enables enhanced brightness and reduced unevenness in brightness over the first LCD element D1 as described above, but it may still happen that brightness varies noticeably at the boundary B between the reflector plate 2 and the second LCD element D2. Even slight variation may occasionally allow a viewer to unwantedly recognize the boundary B. To solve the problem, the reflector plate 2 has a reflectance adjusting means formed at an end area close to the boundary B and adapted to appropriately modify the reflectance at the end area near the boundary B thereby eliminating the problem described above.

Figure 4:
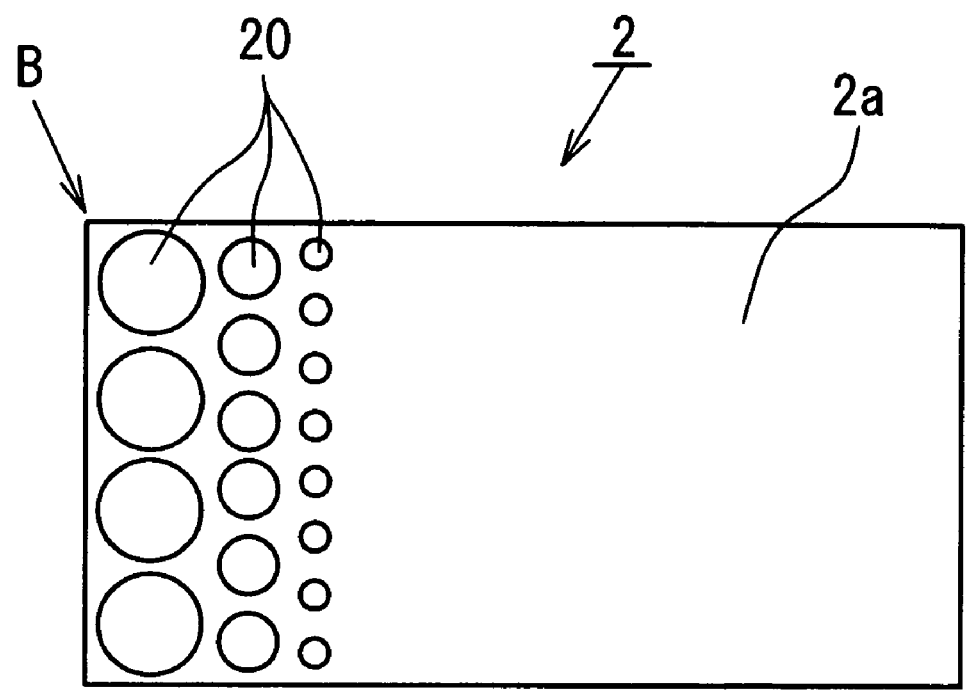
FIG. 4 is a top plan view of a first example of a reflectance adjusting means employed in the present invention.

Referring to FIG. 4, a first example of a reflectance adjusting means comprises a plurality of mechanisms 20 which have a circular shape, are provided on a surface 2a of the reflector plate 2 facing the light conductive plate 11, and which are located at an end area close to the boundary B. The mechanisms 20 are formed by coating the reflector plate 2 with a material, such as white paint, having a lower reflectance than the reflector plate 2. The mechanisms 20 have their area gradually decreasing in accordance with an increase in the distance from the boundary B, whereby the reflector plate 2 has its reflectance gradually decreasing in accordance with a decrease in the distance from boundary B. The size and number of the mechanisms 20 are appropriately determined considering the size and reflectance of the object to be illuminated (the second LCD element D2 in the second embodiment) and the size of the light conductive plate 11. The shape of the mechanisms 20 is not limited to circle but may alternatively be rectangle, or other configurations.

Figure 5:
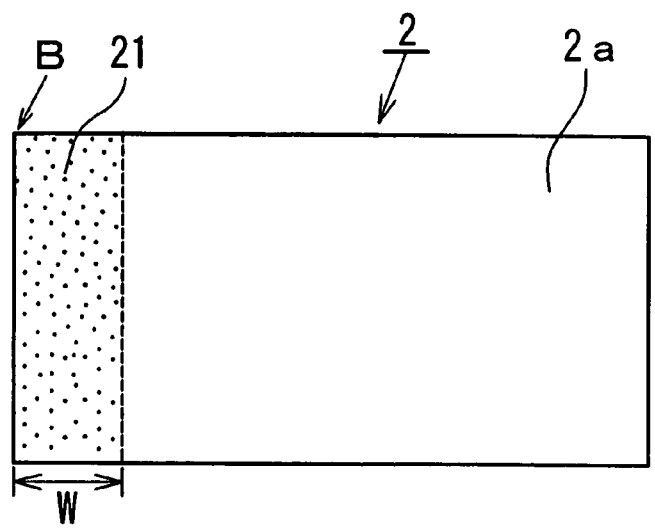
FIG. 5 is a top plan view of a second example of a reflectance adjusting means.

Referring to FIG. 5, a second example of a reflectance adjusting means comprises a strip portion 21 which is provided on a surface 2a of the reflector plate 2 facing the light conductive plate 11, and which is located at an end area close to the boundary B. The strip portion 21 is formed by sticking, on the reflector plate 2, a reflector film, such as a white tape, having a lower reflectance than the reflector plate 2, or by coating the reflector plate 2 with white paint having a lower reflectance than the reflector plate 2 in a strip configuration. The strip portion 21 preferably has its reflectance gradually decreasing in accordance with a decrease in the distance from the boundary B, and has its width W appropriately determined considering the size and reflectance of the object to be illuminated (the second LCD element D2) and the size of the light conductive plate 11.

Figure 6:
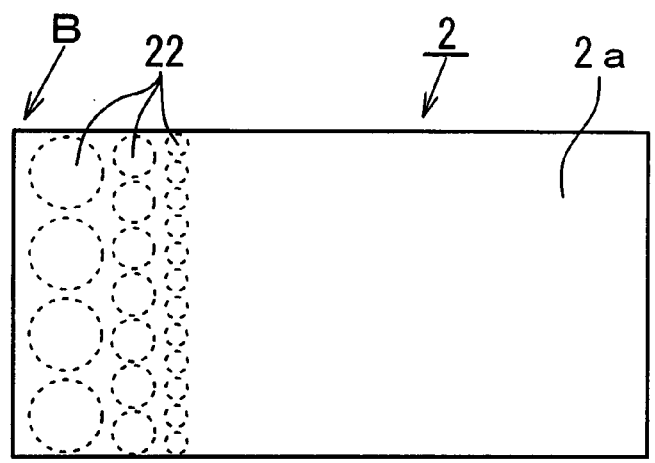
FIG. 6 is a top plan view of a third example of a reflectance adjusting means.

Referring to FIG. 6, a third example of a reflectance adjusting means comprises a plurality of openings 22 which have a circular shape, and which are formed at an end area of the reflector plate 2 close to the boundary B. The openings 22 have their area gradually decreasing in accordance with an increase in the distance from the boundary B, whereby the reflector plate 2 has its reflectance gradually decreasing in accordance with a decrease in the distance from boundary B. The size and number of the openings 20 are appropriately determined considering the size and reflectance of the object to be illuminated (the second LCD element D2) and the size of the light conductive plate 11. The shape of the openings 22 is not limited to circle but may alternatively be rectangle, or other configurations.

Figure 7:
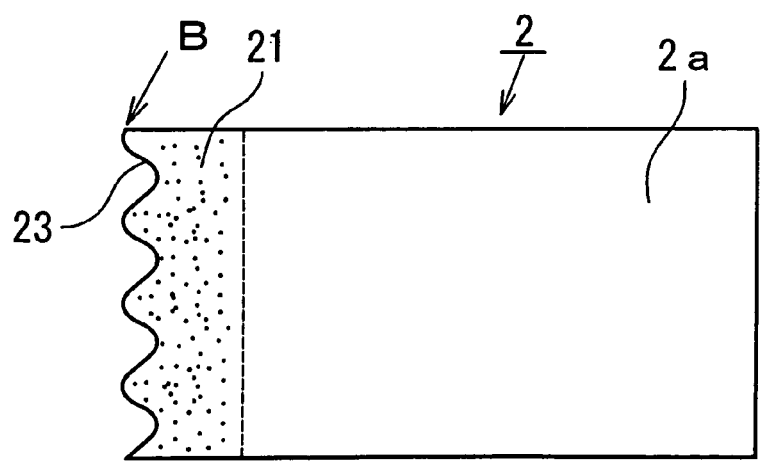
FIG. 7 is a top plan view of a fourth example of a reflectance adjusting means.

Referring to FIG. 7, a fourth example of a reflectance adjusting means comprises the strip portion 21 mentioned in the description of the second example (FIG. 5), wherein the end surface of the reflector plate 2 facing the boundary B defines a corrugated configuration 23. The strip portion 21 is formed and structured, and functions in the same way as discussed above in the description of the second example. The magnitude and interval of the corrugated configuration 23 and the width W of the strip portion 21 are appropriately determined considering the size and reflectance of the object to be illuminated (the second LCD element D2) and the size of the light conductive plate 11. In this connection, the strip portion 21 is not an essential factor and may not necessarily have to be provided if the reflector plate 2 defines the corrugated configuration 23 at its end surface facing the boundary B.

Figure 8:
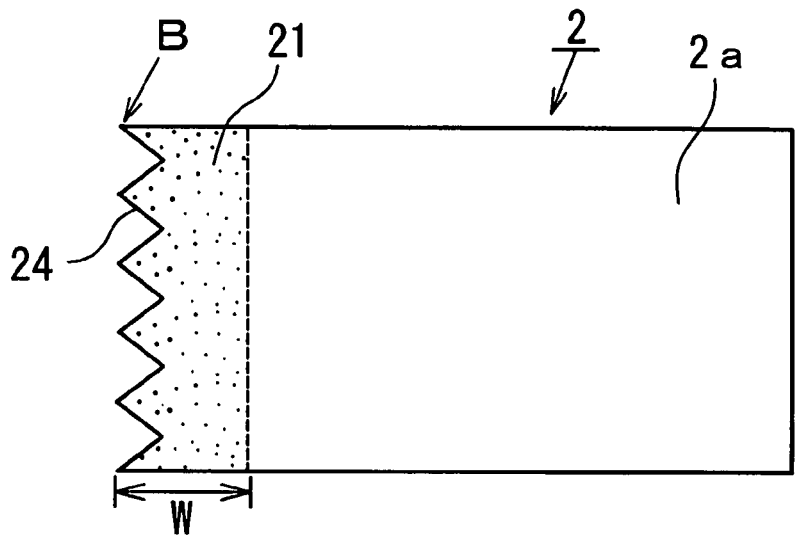
FIG. 8 is a top plan view of a fifth example of a reflectance adjusting means.

Referring to FIG. 8, a fifth example of a reflectance adjusting means comprises the strip portion 21 mentioned in the description of the second example (FIG. 5), wherein the end surface of the reflector plate 2 facing the boundary B defines a serrated configuration 24. The strip portion 21 is formed and structured, and functions in the same way as discussed in the description of the second example. The magnitude and interval of the serrated configuration 24 and the width W of the strip portion 21 are appropriately determined considering the size and reflectance of the object to be illuminated (the second LCD element D2) and the size of the light conductive plate 11. In this connection, the strip portion 21 is not an essential factor and may not necessarily have to be provided if the reflector plate 2 defines the serrated configuration 24 at its end surface facing the boundary B.

Figure 3A:
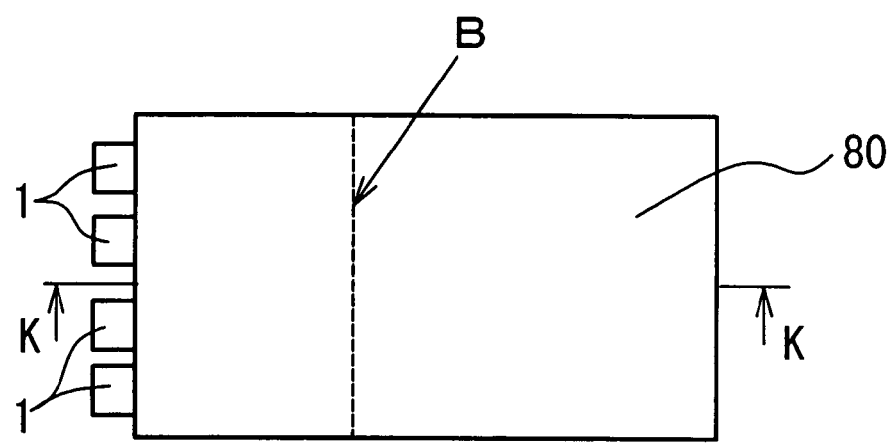
FIG. 3A is a top plan view of a spread illuminating apparatus according to a second embodiment of the present invention.
Figure 3B:
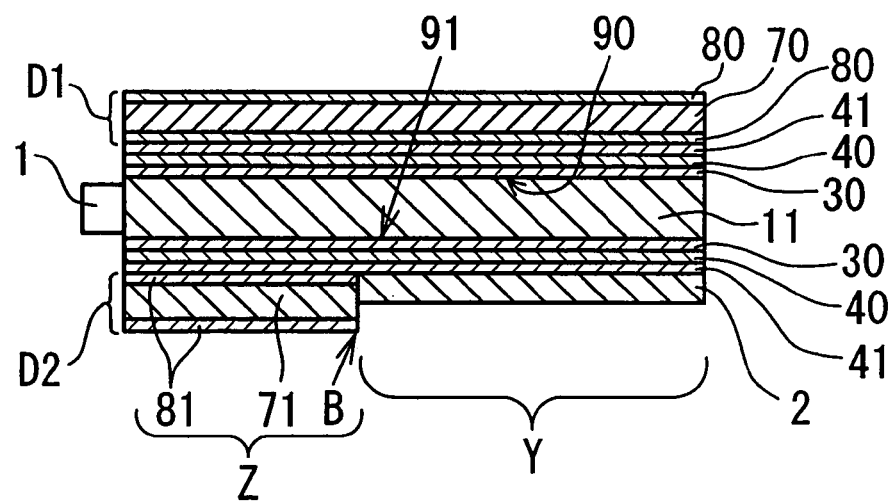
FIG. 3B is a schematic cross sectional view of FIG. 2A taken along a line K—K.

In the first and second embodiments shown in FIGS. 1A/1B and FIGS. 3A/3B, respectively, the reflector plate 2 is disposed away from the light sources 1 but may be disposed close to the light sources 1, or may alternatively be disposed at any location within an area corresponding to the area of the first major surface 90 (the first LCD element D1). In any case, the reflector plate 2 is to be provided over the second major surface 91 so as to reflect light toward the first major surface 90 (the first LCD element D1). Also, two condenser sheets attached to each other are used in the embodiments described above, but only one condenser sheet may be used. And, the light conductive plate 11 shown in the embodiments described above has a rectangular cross section but may alternatively have a wedge-shaped cross section, in which case the reflector plate 2 is provided to be aligned to the configuration of the cross section.

While the present invention has been illustrated and explained with respect to specific embodiments thereof, it is to be understood that the present invention is by no means limited thereto but encompasses all changes and modifications which will become possible within the scope of the appended claims.

What is claimed is:

1. A spread illuminating apparatus for illuminating two objects, the apparatus comprising:
   at least one light source;
   a light conductive plate having the at least one light source at an end surface thereof and defining first and second major surfaces from which light emitted from the at least one light source and introduced in the light conductive plate exits out respectively toward the two objects, wherein the two objects partially overlap each other with the light conductive plate located therebetween;
   an optical sheet unit consisting of a diffuser sheet and a condenser sheet, and disposed on at least the second major surface so as to cover an entire area thereof; and
   a reflecting means having a smaller surface area than the second major surface, and disposed directly on top of the optical sheet unit.

2. A spread illuminating apparatus according to claim 1, wherein the reflecting means is located so as to cover an area of the second major surface other than an area designated as a light exiting surface.

3. A spread illuminating apparatus according to claim 1, wherein the diffuser sheet has a haze factor ranging from 85 to 95%.

4. A spread illuminating apparatus according to claim 1, wherein the condenser sheet is composed of two optical films which each have a prism pattern with a serrated sectional configuration formed on a surface thereof opposite to a surface facing the light conductive plate, and which have their respective prism patterns oriented orthogonal to each other.

5. A spread illuminating apparatus according to claim 1, wherein each optical film of the condenser sheet has a thickness ranging from 50 to 300 µm.

6. A spread illuminating apparatus according to claim 1, wherein the reflecting means has its reflectance gradually varying at a given area close to the area designated as a light exiting surface.

7. A spread illuminating apparatus according to claim 1, wherein a deflecting means is disposed directly on top of the optical sheet unit on the second major surface so as to cover at least an area which is not covered by the reflecting means.

8. A spread illuminating apparatus according to claim 4, wherein each optical film of the condenser sheet has a thickness ranging from 50 to 300 µm.

9. A spread illuminating apparatus according to claim 2, wherein the reflecting means has its reflectance gradually varying at a given area close to the area designated as a light exiting surface.

* * * * *